Figure 1:
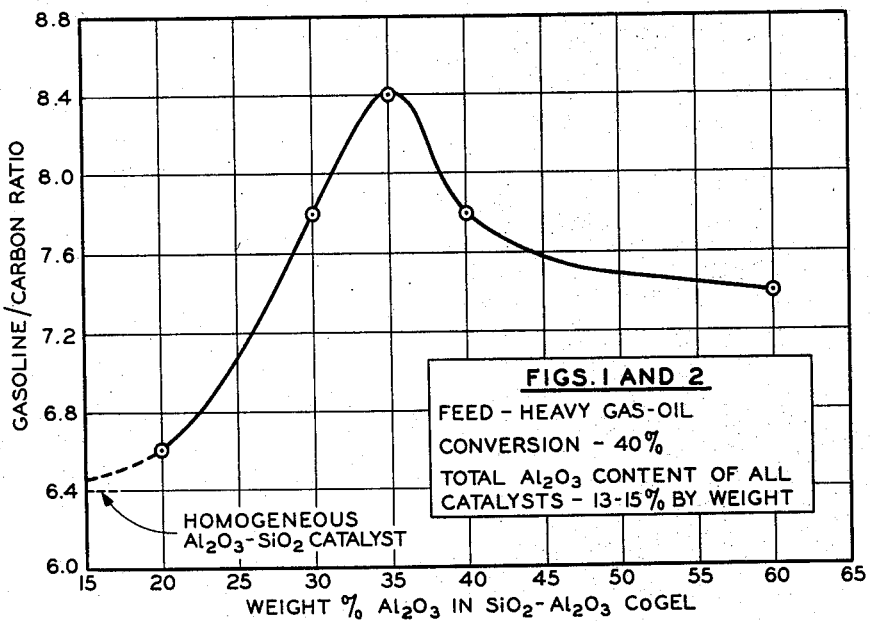

Jan. 20, 1959 R. P. SIEG ET AL 2,870,082
SILICA-ALUMINA CRACKING CATALYST AND METHOD
Filed Dec. 3, 1954

INVENTORS
ROBERT P. SIEG
GEORGE R. BARBER
BY
ATTORNEYS

United States Patent Office 2,870,082
Patented Jan. 20, 1959

2,870,082

SILICA-ALUMINA CRACKING CATALYST AND METHOD

Robert P. Sieg, Berkeley, and George R. Barber, Novato, Calif., assignors to California Research Corporation, San Francisco, Calif., a corporation of Delaware Application December 3, 1954, Serial No. 472,818

15 Claims. (Cl. 208—120)

This invention relates to a novel catalyst composition and to a process for the conversion of hydrocarbons wherein said composition is employed as the catalyst. More particularly, the invention is directed to the provision of a heterogeneous cracking catalyst of the silica-alumina type, and to a process for employing the same in the cracking of petroleum hydrocarbon fractions.

In operations involving the conversion of petroleum and other hydrocarbons, the practice is to contact the catalyst with hydrocarbon vapor at temperatures above about 800° F. until the carbonaceous deposits formed on the catalyst surfaces build up to such an extent as to appreciably impair the activity of the catalyst, whereupon the catalyst is regenerated by burning under controlled conditions and is then ready for reuse. In some operations the catalyst remains as a substantially fixed bed during successive conversion and regeneration cycles, while in others it is maintained in packed moving or in fluidized states and is continuously withdrawn from the reactor, regenerated, and recharged to the conversion zone. In all such operations it is desirable not only that the catalyst have the requisite activity and physical characteristics to hold up well with use, but also that it have the highest possible degree of selectivity in the sense of providing the most favorable distribution of products. While these factors apply to a variety of hydrocarbon conversion processes, they assume particular significance in the cracking of heavy petroleum fractions to gasoline. Accordingly, for purposes of example only, the invention will be hereinafter described in terms of this operation.

It is a general object of this invention to provide a silica-alumina catalyst having good activity and physical properties together with a relatively high degree of selectivity when employed in catalytic hydrocarbon conversion processes. A more particular object is to provide a catalyst of this character which is particularly well adapted for the catalytic cracking of petroleum hydrocarbon fractions to gasoline, which catalyst has excellent selectivity and results in a product stream having a high ratio of gasoline to both coke and gas. The nature of still other objects of the invention will be apparent from a consideration of the descriptive portion to follow.

The present invention is based on the discovery that hydrocarbon feed stocks can readily be converted to the desired products with a high degree of selectivity by contacting the feed at temperatures between about 800 and 1200° F. with a heterogeneous catalyst having a total alumina content of from about 5 to 20% and comprised of from about 10 to 75% of a coprecipitated silica-alumina component dispersed throughout a predominantly silica matrix, said silica-alumina component having an alumina content of from about 20 to 60% and having been introduced into the catalyst in a hydrous, gelatinous state. Percentages of components referred to here and hereafter are on a percent of dry oxide basis. This catalyst has been found to be particularly effective in operations wherein petroleum fractions are catalytically cracked to produce gasoline, for while it is otherwise equivalent to conventional, homogeneous silica-alumina catalysts of a like total alumina content, the present catalyst has a selectivity which is superior to that of said homogeneous catalysts and therefore results in reaction products having abnormally high gasoline/coke and gasoline/gas ratios.

Figure 2:
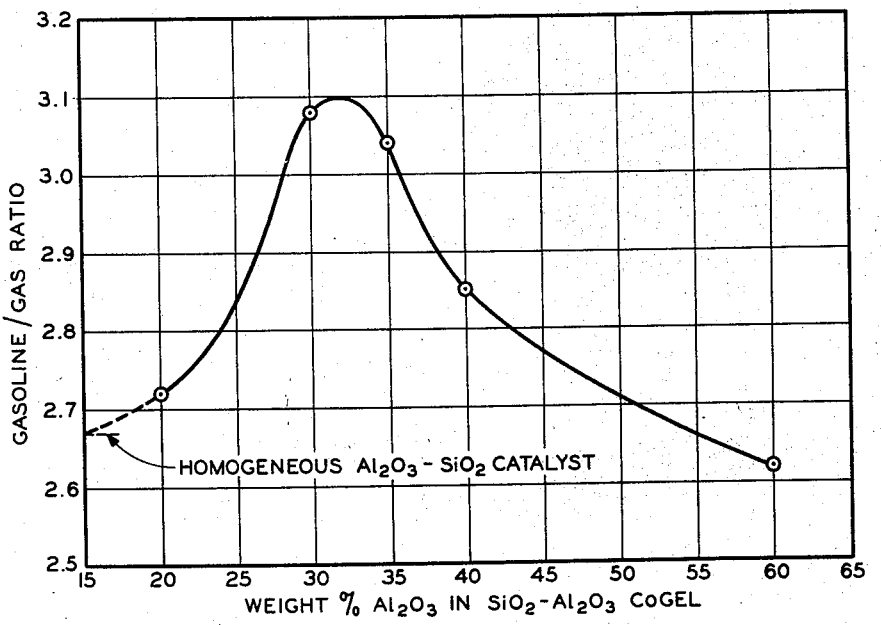

The improved selectivity which characterizes the present catalyst, while set forth in detail in succeeding portions of the specification, can readily be grasped by reference to the data presented in the accompanying drawing, wherein:

Fig. 1 is a graph showing the relation, with catalysts of approximately the same total alumina content, between the alumina content of the dispersed, coprecipitated portion of the catalyst and the gasoline/coke ratio in the product obtained by catalytically cracking a heavy gas oil feed to a given percentage conversion of feed. The gasoline/coke ratio obtained with a homogeneous, commercial silica-alumina catalyst of approximately the same total alumina content is also shown; and Fig. 2 is a graph similar to that of Fig. 1, but relating the alumina content of the dispersed, coprecipitated portion of the catalyst to the gasoline/gas ratio of the product at the same fixed gas oil conversion, and showing also the gasoline/gas ratio obtained with a homogeneous, commercial silica-alumina catalyst of approximately the same total alumina content.

As will be seen from the data presented in the drawing, not only are the heterogeneous catalysts of the present invention possessed of superior selectivity characteristics, but also a critical factor is unexpectedly observed in that said improved selectivity is found to particularly characterize only those heterogeneous catalysts wherein the coprecipitated silica-alumina portion contains between about 20 and 60% by weight alumina, said selectivity going through a peak with catalysts containing from about 25 to 45% by weight alumina in the coprecipitated portion. The cause for this unexpected maximum in selectivity with the heterogeneous catalysts of this invention, which contain from 25 to 45% of alumina in the silica-alumina coprecipitated portion of the catalyst and from 5 to 20% alumina in the total catalyst, is not clearly understood, but is believed to be related to both the nature and location of the active acid centers and to the unique pore size distribution of heterogeneous catalysts of this type.

The catalysts of the present invention can be prepared by any method whereby the hydrous, coprecipitated silica-alumina component can be placed in a finely divided form in admixture with the silica matrix portion of the catalyst. We have found that the preferred method of attaining this end, both from the standpoint of catalyst performance characteristics as well as from that of obtaining better control of the composition of the respective catalyst components, is to separately form the silica-alumina component, and then to admix the latter in a hydrous, finely divided form with the silica matrix.

The hydrous, coprecipitated silica-alumina portion of the present catalyst can be prepared by any one of the methods known in the art. However, the preferred method is one involving coprecipitation of the desired product from a solution containing suitable siliceous and aluminum compounds in amounts so calculated as to provide from 20 to 60% alumina, based on the equivalent dry oxides content of the solution. The generally homogeneous product which forms as the solution reaches a certain value of concentration and pH is gelatinous in character and, depending on the concentration of the respective components as well as on pH and other factors, ranges from a true hydrogel to gelatinous precipitates or mixtures of hydrogel and gelatinous precipitates, such gelatinous products being generically referred to herein as hydrous coprecipitates. Thus, good results can be obtained by mixing together an acidified, aqueous solution of an aluminum salt such as aluminum sulfate or aluminum nitrate with an aqueous solution of a siliceous compound such as sodium metasilicate or a commercial water glass of any desired $SiO_2/Na_2O$ ratio, the salts being added in an amount sufficient to provide the desired alumina content in the final product. Solutions of this character set to a homogeneous gel, particularly below neutral pH at relatively low concentrations and with heating. The resulting gels may then be finely divided, as by passage through a colloid mill, and then combined with a suitable silica matrix. The latter step can be effected either by introducing appropriate amounts of the finely divided acidic coprecipitate into an aqueous alkaline silicate solution, which is then mixed and allowed to set to a heterogeneous gel, or by admixing the coprecipitate with a previously formed silica gel or even with calcined silica gel particles. Much the same results are secured in either case, the critical factor being that the alumina-silica coprecipitate be in the hydrous, gelatinous condition at the time it is mixed with the silica component.

As indicated above, the matrix of the present catalyst comprises from 25 to 90% by weight thereof and is made up predominantly of silica. By this it is meant that the matrix contains at least 85% and preferably 90 to 100% by weight silica, with the remaining percentage being made of nonreducible metal oxides of amphoteric metals such as alumina, zirconia, magnesia, thoria and beryllia, etc., or of combinations of these oxides. The inclusion of such nonsiliceous components in the matrix has been found to be without any large effect on the selectivity of the catalyst, though in some cases they are found to effect marginal increases in catalyst activity. The presence of these additional oxides is disadvantageous only in that in some cases they tend to reduce the strength of the matrix, an effect which is a particular drawback when the catalyst is to be provided in the beaded or other form for employment in such processes as those wherein the catalyst is subjected to physical attrition with use. In this connection, it has been found that the impairment in the physical strength of the matrix is not unduly great provided that the total content of the nonsiliceous oxides is kept below 10%, and more preferably below about 5% based on the weight of the matrix component of the catalyst.

As stated above, the method of catalyst preparation involving admixture of a preformed, hydrous silica-alumina coprecipitate with a predominantly silica matrix is advantageous in that not only does it result in the production of catalysts having superior performance characteristics from the standpoint of their use in the cracking of petroleum and other hydrocarbons, but it also affords of accurate control of the composition of the respective catalyst components to assure catalyst compositions within the concentration range found to be required for maximum selectivity. The method thus has advantages over those involving in situ deposition of the silica-alumina component within a silica matrix of lesser alumina concentration, as by suitable adjustment of the pH of a silica-alumina containing sol, or by increasing its alumina content or insufficiently mixing the same as it sets to a gel. However, catalysts prepared by such methods which otherwise meet the compositional limits defined herein as to the respective silica-alumina coprecipitate and silica matrix components properly come within the scope of this invention, as do hydrocarbon cracking methods employing the same.

Once the hydrous silica-alumina coprecipitate particles have been admixed with the silica matrix, the catalyst is processed by conventional techniques, including such steps as solvent and/or water-washing, washing with ammonium or aluminum salt solutions to replace zeolytically held sodium ions wtih ammonium and aluminum ions (the ammonium ions being driven off as ammonia gas during subsequent heating and the aluminum ions remaining to be converted to additional alumina) and thereafter drying and calcining the product to activate the same. If pelleted or other bead-shaped catalyst particles are desired, droplets or globules of the liquid mixture of silica-alumina coprecipitate with silica sol can be passed into a fluid medium such as oil or the like which is immiscible with water, and wherein the liquid particles introduced set to a gel before they pass out of that medium. The resulting gelled shapes are thereafter washed, base-exchanged, dried and calcined in the usual fashion. Granular or powdered forms can be prepared by breaking up or grinding the gelled silica-alumina-containing matrix to products of the desired size at any stage of the drying or calcining operations, with the resulting product being screened or otherwise classified to provide catalyst particles of the desired size. Still other conventional processes such as extrusion, compression pelleting, moulding, and spray drying for producing microspheres, may be employed while working up the catalyst, as disclosed in the art. The present invention is illustrated in various of its embodiments by the following examples:

EXAMPLE I

In this operation catalysts, whose preparation is described in the succeeding paragraph, were employed in comparative cracking operations wherein a heavy gas oil feed was passed through the catalyst at a LHSV (liquid hourly space velocity, i. e., volumes of feed, calculated as liquid, per superficial volume of catalyst, per hour) of 1.5, at a reactor temperature of 900° F., and at atmospheric pressure, the time on-stream or catalyst-to-oil ratio being varied to control the conversion level. Catalysts were compared at 40% conversion to provide a reliable basis for comparing catalytic selectivity. In each run an analysis was made of the products to determine the amount of the converted material going to gasoline (volume percent) as well as the amounts going to gas and coke (both weight percent). The results of these product analyses are presented in Table I, such data also affording the bases for the material presented in Figs. 1 and 2 of the drawing.

Catalyst "A," representative of conventional, commercial, homogeneous catalysts, was prepared by forming a solution containing 65 grams of $Al_2(SO_4)_3.18H_2O$, 1182 ml. of water and 25 ml. of concentrated sulfuric acid, to which was then added a solution of 596 grams of Grade N sodium silicate diluted with 800 ml. of water. The resulting sol was mixed well, and formed into beads by being allowed to set up to a clear homogeneous gel while passing down through a column of oil. The beads were thereafter subjected to a base exchange treatment with an aqueous solution of aluminum sulfate, thereby increasing the solids content slightly and bringing the alumina content up to approximately 11 to 13%. The product was thereafter treated with an aqueous solution of ammonium chloride in order to further reduce the sodium content, following which it was water-washed to remove sulfate and the last traces of sodium. The product was then dried for several hours in a steam atmosphere at 300° F. and then calcined for 4 hours at 1200° F.

Catalysts "B," "C," "D," "E," "F" are representative of the present invention and contain 20, 30, 35, 40 and 60%, respectively, of alumina in the dispersed, silica-alumina component, all containing a total of approximately 13 to 15% alumina. Since the general method of preparation is the same for each, the following detailed preparation (for catalyst "D") will serve for the others in the series. In preparing catalyst "D," 102 grams of $Al_2(SO_4)_3 \cdot 18H_2O$ were dissolved in 400 ml. of water and 3.5 ml. concentrated sulfuric acid and combined with a solution containing 102 grams of Grade N sodium silicate in 400 ml. of water. The sol as first prepared was translucent and homogeneous and had a pH of 3.5. After standing at room temperatures for 24 hours, it was found that the sol had set up as a fairly firm, homogeneous gel. To this gel was added 400 ml. of distilled water, following which the mixture was stirred thoroughly and then dispersed with a high speed mixing device in order to obtain the gel in a finely divided condition. To the dispersed gel was added, slowly and with stirring, a solution of 247 grams of Grade N sodium silicate and 17 grams anhydrous sodium hydroxide in 400 ml. of water. The resulting sol, which had a pH of about 8.5, rapidly set, with stirring, to a white, opaque gel having a solids content of 5.6% of which approximately 14% was alumina. This gel was then heated at 125° F. for 4 hours, then filtered and base exchanged with a 10% ammonium chloride solution, following which the solution was again filtered and then given an identical base exchange treatment, care being observed to thoroughly stir the gel after the addition of each processing solution. The sample was then thoroughly water-washed three times, after which it was heated for several hours at 300° F. and then calcined for four hours at 1200° F. Following the calcining step the sample was broken up and screened so as to provide the desired through 4, on 14 mesh catalyst.

Table I
COMPARATIVE CRACKING SELECTIVITY

[Feed—heavy gas oil; conversion—40%; LHSV—1.5; temperature—900° F.; atmospheric pressure.]

|  | Conventional Homogeneous Catalyst "A" | Heterogeneous Catalysts | | | | |
|---|---|---|---|---|---|---|
|  |  | "B" | "C" | "D" | "E" | "F" |
| Total alumina content | 13 | 14 | 15 | 14 | 14 | 13 |
| Alumina content of alumina-silica coprecipitate |  | 20 | 30 | 35 | 40 | 60 |
| Coke (wt. percent, based on feed) | 4.5 | 4.4 | 4.0 | 3.7 | 4.0 | 4.0 |
| Gas (wt. percent, based on feed) | 10.8 | 10.7 | 10.0 | 10.2 | 10.6 | 11.2 |
| Gasoline (vol. percent, based on feed) | 28.8 | 29.0 | 30.8 | 31.0 | 30.4 | 29.3 |
| Ratio, gasoline/coke | 6.40 | 6.6 | 7.7 | 8.4 | 7.8 | 7.3 |
| Ratio, gasoline/gas | 2.67 | 2.72 | 3.08 | 3.04 | 2.85 | 2.62 |

EXAMPLE II

In the runs covered in this example, catalysts "G," "H," "I" and "J" were prepared in a fashion similar to that of catalyst "D" in Example I above, except that here the composition of the silica matrix portion of each catalyst was altered so that each matrix contained 5% by weight of an additional oxide, these oxides being magnesia, alumina, zirconia and thoria in catalysts "G," "H," "I" and "J," respectively. The magnesia-containing sample (catalyst "G") was prepared by adding 3.6 grams magnesium oxide powder, 247 grams of Grade N sodium silicate and 17 grams sodium hydroxide, all in 400 ml. of water, to the 35% alumina, silica-alumina cogel of catalyst "D," the catalyst thereafter being worked up in the same fashion as the "D" material. Catalysts "H" and "I" and "J" were prepared in a similar fashion, except that the magnesium oxide was replaced by equivalent amounts of aluminum sulfate, zirconium chloride and thorium nitrate. As will be seen from the data of Table II below, the inclusion of the added oxide component in the silica matrix was without substantial effect on the catalyst selectivity.

Table II

[Feed—heavy gas oil; conversion—40%; LHSV—1.5; temperature—900° F.; atmospheric pressure.]

|  | Heterogeneous Catalysts | | | | |
|---|---|---|---|---|---|
|  | "D" | "G" | "H" | "I" | "J" |
| Total alumina content | 14 | 14 | 16 | 14 | 13 |
| Other oxide in SiO2 matrix | None | MgO | $Al_2O_3$ | $ZrO_2$ | $ThO_2$ |
| Alumina content of alumina-silica coprecipitate | 35 | 35 | 35 | 35 | 35 |
| Coke (wt. percent, based on feed) | 3.7 | 3.8 | 3.7 | 3.6 | 3.6 |
| Gas (wt. percent, based on feed) | 10.2 | 10.0 | 10.4 | 10.4 | 10.8 |
| Gasoline (wt. percent, based on feed) | 31.0 | 31.0 | 30.5 | 30.5 | 31.0 |
| Ratio, gasoline/coke | 8.4 | 8.2 | 8.2 | 8.5 | 8.6 |
| Ratio, gasoline/gas | 3.04 | 3.10 | 2.93 | 2.93 | 2.87 |

EXAMPLE III

In the runs covered in this example, cracking operations were again conducted with a heavy gas oil, with the results obtained from the use of catalyst "D" being compared with those of catalysts "K," "L" and "M" wherein one or both of the silica-alumina coprecipitate and silica matrix components of the catalyst were supplied in dry, powdered form. As will be seen from the data of Table III below, it is necessary for good selectivity that at least the silica-alumina coprecipitate material be admixed when in the hydrous form with the silica matrix component.

In catalyst "K," a 35% alumina, alumina-silica gel (prepared in the same fashion as that combined with the silica solution in forming catalyst "D") was freed of its sodium content in the usual fashion and thereafter dried, calcined and ground to provide a 325 mesh material. The product so obtained was then thoroughly mixed with a hydrous silica gel in an amount sufficient to provide a total alumina content in the catalyst of approximately 13%. The silica gel so employed was prepared by adding 1256 grams of Grade N sodium silicate in 2368 ml. of water to a sol of 100 ml. of concentrated sulfuric acid in 1932 ml. of water, the resulting gel having a pH of 5.9 and a solids content of 6.28%. This product was base exchanged with 0.2 M. sulfuric acid solution, following which it was thoroughly water-washed and admixed with the ground alumina-silica material. The resulting mixture was then dried, calcined, ground, and pelleted to provide the final catalyst.

Catalyst "L" was prepared by mixing the calcined, ground, 35% alumina, alumina-silica material of catalyst "K" with a similarly calcined and ground silica material obtained from the silica gel whose preparation is described in the preceding paragraph, the resulting mixture being pelleted before use.

Catalyst "M" was prepared by admixing the ground silica material of catalyst "L" with the hydrous, 35% alumina, silica-alumina cogel, as prepared sodium-free for use in connection with catalyst "K," after which the resulting gel was dried, calcined, ground, and pelleted.

Table III

[Feed—heavy gas oil; conversion—40%; LHSV—1.5; temperature—900° F.; atmospheric pressure.]

|  | Heterogeneous Catalysts | | | |
|---|---|---|---|---|
|  | "D" | "K" | "L" | "M" |
| Total alumina content | 14 | 13 | 16 | 16 |
| Alumina content of alumina-silica coprecipitate | 35 | 35 | 35 | 35 |
| Coke (wt. percent, based on feed) | 3.7 | 4.3 | 5.1 | 3.8 |
| Gas (wt. percent, based on feed) | 10.2 | 11.7 | 11.6 | 10.6 |
| Gasoline (wt. percent, based on feed) | 31.0 | 29.2 | 27.8 | 30.0 |
| Ratio, gasoline/coke | 8.4 | 6.8 | 5.5 | 7.9 |
| Ratio, gasoline/gas | 3.04 | 2.50 | 2.40 | 2.83 |

We claim:

1. A silica-alumina catalyst having a total alumina content of from about 5 to 20% by weight, which catalyst is comprised of from about 10 to 75% by weight of a coprecipitated, silica-alumina component dispersed throughout a predominantly silica matrix, said silica-alumina component having an alumina content of from about 20 to 60% by weight and having been introduced into the catalyst in a hydrous state.

2. The catalyst of claim 1 wherein the matrix component is comprised of from 85 to 100% by weight silica and a total of from 0 to 15% by weight of at least one nonreducible, amphoteric metal oxide.

3. The catalyst of claim 2 wherein said matrix contains 0 to 10% by weight alumina.

4. The catalyst of claim 2 wherein said matrix contains from 0 to 10% by weight magnesia.

5. The catalyst of claim 2 wherein said matrix contains 0 to 10% by weight zirconia.

6. The catalyst of claim 2 wherein said matrix contains from 0 to 10% by weight thoria.

7. A silica-alumina catalyst having a total alumina content of from about 5 to 20% by weight, which catalyst is comprised of from about 10 to 75% by weight of a coprecipitated, silica-alumina component dispersed throughout a predominantly silica matrix, said silica-alumina component having an alumina content of from about 25 to 45% by weight and having been introduced into the catalyst in a hydrous state.

8. In a process for the catalytic conversion of a hydrocarbon feed, the step comprising contacting said feed at temperatures between about 800 and 1200° F. with a particle-form, heterogeneous catalyst comprised of from about 10 to 75% by weight of a coprecipitated silica-alumina component dispersed throughout a predominantly silica matrix, said silica-alumina component having an alumina content of from about 20 to 60% by weight and having been introduced into the catalyst in a hydrous state, the catalyst having a total alumina content of from about 5 to 20% by weight.

9. The process of claim 8 wherein the matrix component of the catalyst is comprised of from 85 to 100% by weight silica and a total of from 0 to 15% by weight of at least one nonreducible amphoteric metal oxide.

10. In a process for the catalytic conversion of a hydrocarbon feed, the step comprising contacting said feed at temperatures between about 800 and 1200° F. with a particle-form, heterogeneous catalyst comprised of from about 10 to 75% by weight of a coprecipitated silica-alumina component dispersed throughout a predominantly silica matrix, said silica-alumina component having an alumina content of from about 25 to 45% by weight and having been introduced into the catalyst in a hydrous state, the catalyst having a total alumina content of from about 5 to 20% by weight.

11. In a process for the catalytic cracking of a heavy petroleum distillate to gasoline with a high degree of selectivity, the steps comprising bringing said distillate, at temperatures between about 800 and 1200° F., into contact with a particulate silica-alumina catalyst having a total alumina content of from about 5 to 20% by weight and comprised of from about 10 to 75% by weight of a coprecipitated, silica-alumina component dispersed throughout a predominantly silica matrix, said silica-alumina component having an alumina content of from about 20 to 60% and having been introduced into the catalyst in a hydrous state, and said matrix being comprised of from 85 to 100% by weight silica together with a total of from 0 to 15% by weight of at least one nonreducible, amphoteric metal oxide; and recovering gasoline from the resulting product stream.

12. The process of claim 11 wherein the silica matrix component of the catalyst contains from 0 to 10% by weight alumina.

13. In a method for producing a silica-alumina cracking catalyst having a high degree of selectivity in processes wherein heavy petroleum distillates are converted to gasoline, the steps comprising forming a hydrous, silica-alumina coprecipitate containing between 20 and 60% by weight of alumina on a dry oxide basis, admixing said coprecipitate in the finely divided state with a predominantly silica component in an amount such that the resulting mixture contains a total of from 5 to 20% alumina on a dry oxide basis, freeing the mixture from any sodium ions present, and thereafter drying and calcining the resulting product to form the desired catalyst.

14. In a method for producing a silica-alumina cracking catalyst having a high degree of selectivity in processes wherein heavy petroleum distillates are converted to gasoline, the steps comprising forming a hydrous, silica-alumina coprecipitate containing between 20 and 60% by weight of alumina on a dry oxide basis, admixing said precipitate in the finely divided state with an aqueous solution of an alkaline silicate in an amount such that the resulting mixture contains a total of from 5 to 20% alumina on a dry oxide basis, allowing the mixture to gel; freeing the gel of any sodium ions present; and drying and calcining the resulting gel to form the desired catalyst.

15. The method of claim 14 wherein the gellation step is effected by passing droplets of the aqueous, silica-alumina-containing silicate solution through a fluid medium immiscible with water whereby the droplets are converted to bead-shaped, gel particles.

References Cited in the file of this patent

UNITED STATES PATENTS

| | | |
|---|---|---|
| 2,369,001 | Ahlberg et al. | Feb. 6, 1945 |
| 2,384,943 | Marisic | Sept. 18, 1945 |
| 2,579,123 | Pardee | Dec. 18, 1951 |